W. D. GRIMSHAW.
Fire Alarm.
No. 27,282. Patented Feb. 28, 1860.
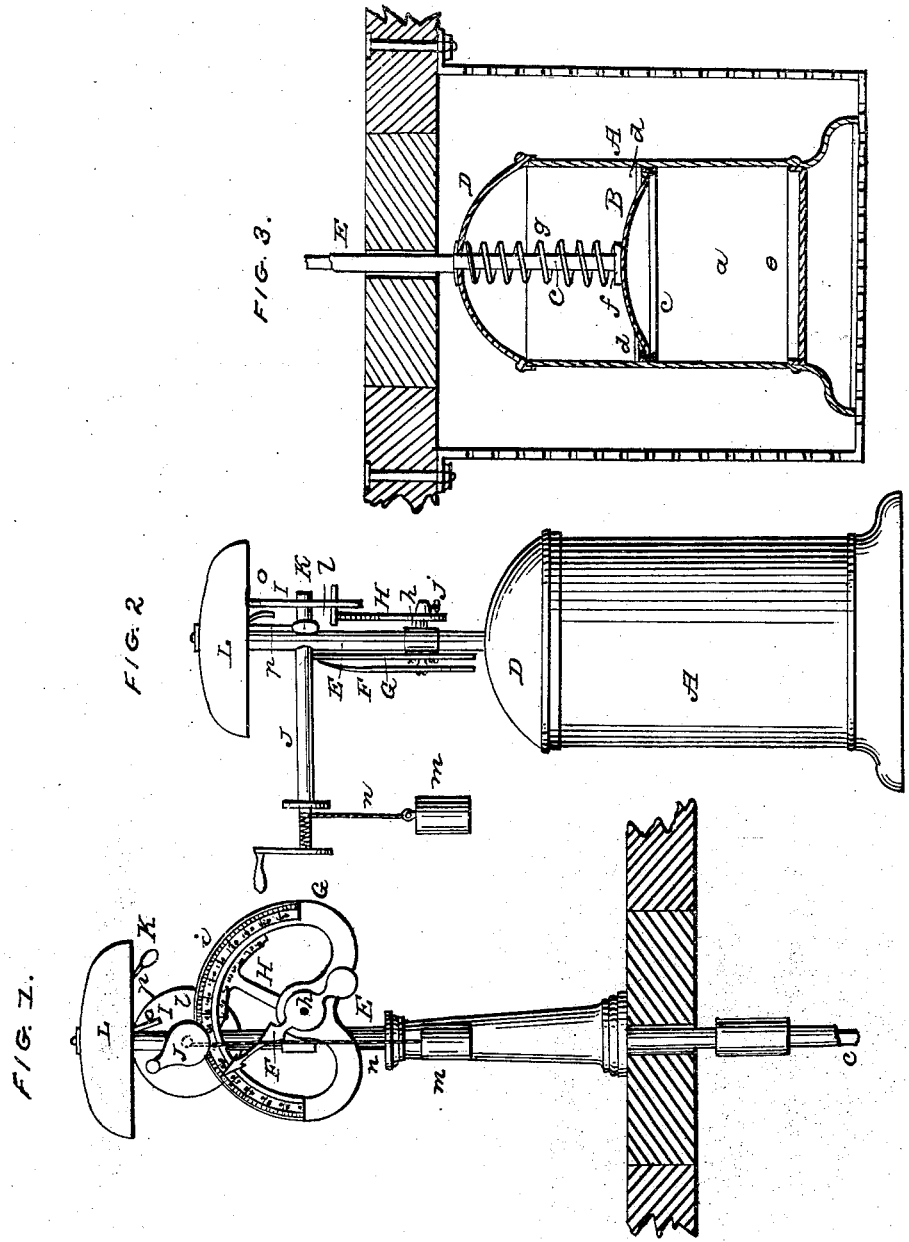
WITNESSES:
INVENTOR.

UNITED STATES PATENT OFFICE.

WM. D. GRIMSHAW, OF NEWARK, NEW JERSEY.

FIRE-ALARM.

Specification of Letters Patent No. 27,282, dated February 28, 1860.

*To all whom it may concern:*

Be it known that I, W. D. GRIMSHAW, of Newark, in the county of Essex and State of New Jersey, have invented a new and Improved Fire-Detecter; and I do hereby declare that the following is a full, clear, and exact description of the same, reference being had to the accompanying drawings, forming a part of this specification, in which—

Figure 1 represents a sectional front elevation of my invention, showing its application to a vessel. Fig. 2 is a side elevation of the same.

Similar letters of reference in both views indicate corresponding parts.

This invention consists in arranging an air-tight vessel covered by an elastic diaphragm, and filled with air of somewhat higher pressure than that of the external air, in such relation to an index of some sort that the expansion or contraction of the air contained in the air tight vessel caused by a change in the temperature of the surrounding air or gas can be observed from the motion of the index; and my invention consists also in combining with the said air-tight vessel and with the index a quadrant and an alarm-bell, or other device for making a noise, in such a manner that as soon as the air or gas surrounding the air-tight vessel rises beyond a certain temperature the bell or other device is caused to sound, thus making an effective alarm in case of an approaching spontaneous combustion of the cargo of a vessel, and also in breweries, distileries and other manufactories, or places, as will be hereinafter more fully explained.

To enable those skilled in the art to make and use my invention I will proceed to describe its construction and operation, with reference to the drawing.

A represents an air-tight cylindrical vessel of metal, which is divided into two compartments, $a$ $b$, by a flexible and elastic diaphragm, B. This diaphragm rests on a ring, $c$, secured to the inside of the cylinder at about the middle of its height and it is retained by another ring, $d$, as clearly shown in Fig. 1. After the diaphragm has thus been secured in its place, the air in the compartment, $b$, is rarefied to a certain extent, whereby the diaphragm is caused to bulge out as shown in Fig. 1, and the bottom, $e$, is now soldered or otherwise secured to the cylinder, A, in such a manner that the air contained in the compartment, $a$, is confined therein, keeping the diaphragm bulged out even after the full pressure of the atmosphere is allowed to act on its convex side.

The diaphragm, B, supports a rod, C, which passes through the cover, D, of the cylindrical vessel, A, and secured to the lower end of this rod is a washer, $f$, of a sufficiently large diameter to prevent any injury to the diaphragm. A spiral spring, $g$, which is interposed between the cover, D, and the washer, $f$, keeps the latter down tight on the diaphragm, so that the least expansion or contraction of the air in the compartment, $a$, causes a corresponding rise or fall in the rod, C. Said rod, C, extends up through a projecting tube, E, as high as may be desired, and its upper end forms a toothed rack, which gears into a pinion on the arbor, $h$, that bears the index, F. This index moves over a scale, $i$, marked on a plate or arc, G, said scale being made to correspond to the scale of a common thermometer, so that if the temperature of the air surrounding the vessel, A, rises two degrees, the index travels from one of the marks on the scale to the other.

In order to connect the index with the alarm bell, a quadrant, H, is secured to the arbor, $h$, and made adjustable by a set screw, $j$, and said quadrant is marked with a scale, $k$, the degrees of which correspond to the degrees of the arc, G. This quadrant forms the stop for a pin, $l$, that is inserted into a disk, I, mounted on a horizontal arbor, J, from which a weight, $m$, is suspended by means of a cord, $n$, in such a manner that on releasing the pin, $l$, the arbor, J, together with the disk, I, is caused to rotate in the direction of the arrow marked on the latter in Fig. 1, and by this motion the pin, $l$, is brought in contact with one end, $o$, of an elbow lever, $o$ $p$, the other end, $p$, of which bears a hammer, K, and as the pin, $l$, strikes the arm, $o$, the hammer is caused to fly up against the bell, thus serving as a regular alarm. Instead of a hammer and bell any other device, for making a noise, which can conveniently be connected with the rod, C, may be used. The operation of my apparatus will be better understood from an example.

If the mean temperature in a certain space, such as a room or greenhouse, or in a vessel, be fifty-six degrees (56°) and it is desirable to know when the temperature rises beyond seventy-four degrees (74°), the quadrant, H, is set so that the pin, $l$, will strike the same at eighteen degrees (18°) of the scale marked on it when the index shows fifty-six degrees (56°). If the temperature rises the quadrant is caused to move in the direction of the arrow marked on the same, and by the time the index hand points to seventy-four (74) on the arc, G, the quadrant, H, has moved far enough to release the pin, $l$, and the alarm is sounded.

This apparatus is of particular advantage when placed in a ship's hold, or any place, or different compartments of the ship, a rod, passing to the deck, of suitable length, or at any suitable place to connect with the index and with the quadrant. Any excess of heat whether arising from spontaneous combustion or any other cause is thus shown at all times, so that by taking a memorandum the increase of temperature in any given time will be known, and that the day when the ship would be on fire can be ascertained. If too far at sea to run to a port before the heat becomes dangerous, then a hole must be cut through the deck and the cargo removed, or some other means must be formed to remove the cause.

My apparatus may however be used with equal advantage as a thermometer for brewers, distillers, chemists, etc., as the same can be inserted in liquids or gases in any part of the premises, and the temperature can be read off on a dial in any convenient place.

When used in connection with a stove or steam-boiler my apparatus serves also as a draft regulator, in which case it has to be connected with a damper so as to increase or diminish the draft as the temperature falls or rises. My apparatus may also be attached to the slides or ventilators so that by the eduction of rarefied air or gases or the admission of the external atmosphere a uniform temperature will be obtained in rooms, or in hot-houses, conservatories, etc., and in the two last cases the quadrant, H, has to be connected by a cord or other suitable arrangement with the dampers or ventilators so that any expansion or contraction of the air in the compartment, $a$, of the vessel, A, causes an immediate motion of the dampers or ventilators.

What I claim as new, and desire to secure by Letters Patent, is:—

1. The arrangement of the elastic diaphragm, B, in the air-tight vessel, A, in combination with the index, F, or its equivalent, constructed and operating substantially as and for the purpose specified.

2. Combining with the vessel, A, and index, F, a quadrant, H, or its equivalent, and alarm-bell, L, or its equivalent, substantially in the manner and for the purpose described.

WILLIAM D. GRIMSHAW.

Witnesses:
 WM. THOMPSON,
 W. HAUFF.